UNITED STATES PATENT OFFICE.

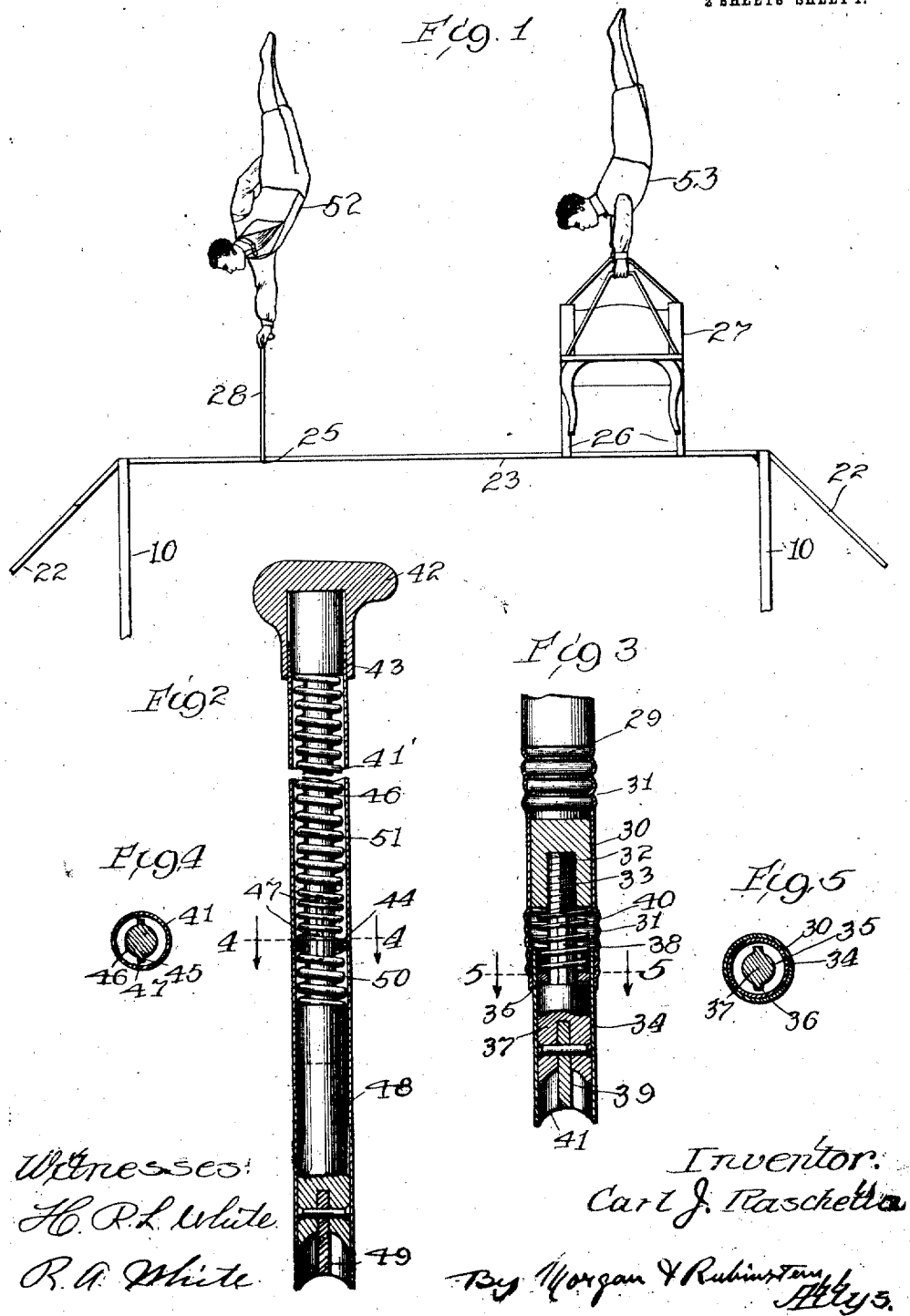

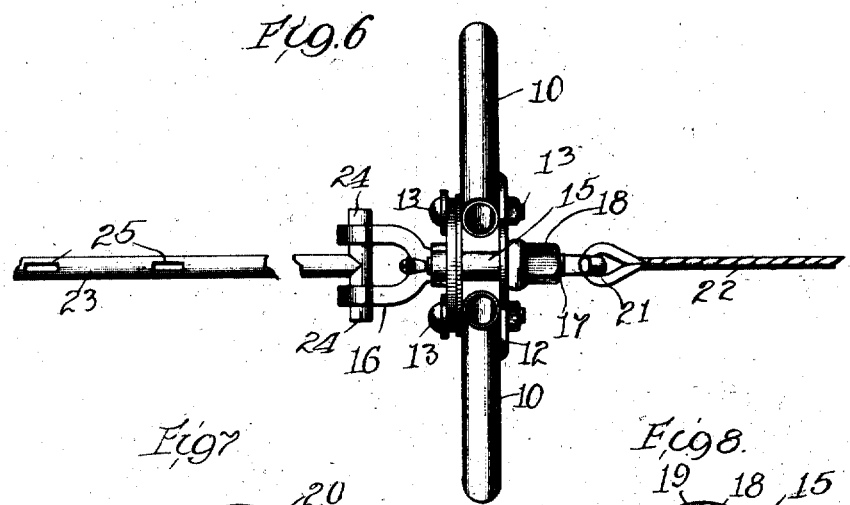
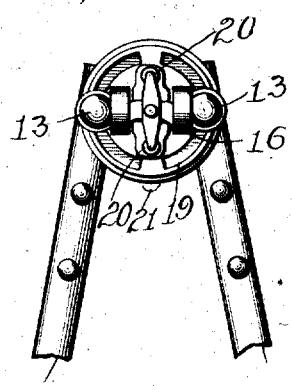
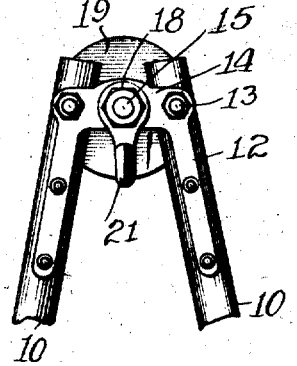
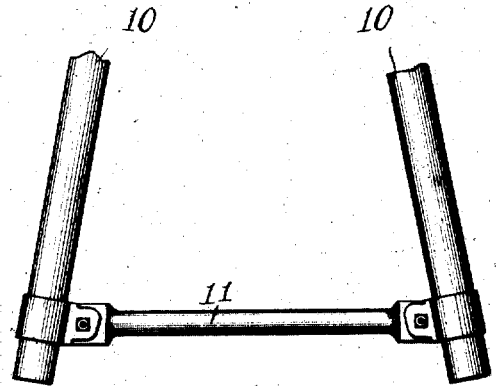
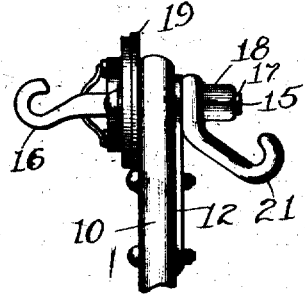

CARL J. RASCHETTA, OF CHICAGO, ILLINOIS.

APPARATUS FOR ACROBATIC PERFORMANCES.

1,001,300.  Specification of Letters Patent.  Patented Aug. 22, 1911.

Application filed August 20, 1910. Serial No. 578,134.

*To all whom it may concern:*

Be it known that I, CARL J. RASCHETTA, a citizen of the United States, and a resident of Chicago, county of Cook, and State of Illinois, have invented a new and useful Improvement in Apparatus for Acrobatic Performances.

The object of my invention is to substitute for rope, wire, or cable used by tight-rope and wire performers; and means connected therewith whereby hand balancing acts may be performed not hitherto possible with any means previously used.

The manner in which I accomplish my object is described in the following specification and illustrated in the accompanying drawings in which:—

Figure 1 represents my device erected for use with the hand balancing illustrated as performed with a walking stick and a chair. Fig. 2 is a vertical sectional view of the stick. Fig. 3 is a vertical sectional view of the ends of the hind legs of the chair. Fig. 4 is a cross section on the line 4—4 Fig. 3.
Fig. 5 is a cross section on the line 5—5 Fig. 3. Fig. 6 is a top plan view of the standards and means connected therewith hereinafter described. Fig. 7 is a vertical elevation of part shown in Fig. 6. Fig. 8 is the reverse of the elevation shown in Fig. 7. Fig. 9 is a vertical elevation of the parts shown in Figs. 6, 7, and 8.

In the drawings 10 indicates the standards which are braced near the lower ends by the connecting rods 11. The upper ends are connected by the plates 12 provided with pivotal bolts 13 which permit the standards to be closed when the connecting rods 11 are disconnected. Through the transverse part 14 of these plates bolts 15 extend. The one end of this bolt forms a double hook 16, and at the other end 17 it is threaded for the nut 18. Secured to the standards 10 by the pivot bolts 13 is a circular plate 19 through the center of which the bolt 15 extends, and is so connected by the screws 20 as to prevent any rotary movement of the bolt 15. On the bolt 15, between the nut 18 and the plate 12 is a hook 21 to which a cable brace 22 is linked. The other ends of these cables are adapted to be secured, by any suitable means, to the floor on which the standards rest. Secured in the double hook 16 is a tempered steel bar 23 provided with T ends 24 which are adapted to be linked in said double hooks. Extending vertically through the bar 23 are oblong apertures 25 suitably spaced to correspond with the hind legs 26 of the chair 27 and for the use of the stick 28. The chair 27 is of any particular form desired except in respect to the hind legs 29 which are shortened and shouldered at the ends to support the devices shown in Fig. 3. This device consists of a tube 30 strengthened at each end by an ornamental ring 31. These tubes are secured permanently on the shouldered ends of the hind legs of the chair. Fixed inside the tubes and butting against the shouldered ends of the legs are plugs 32 having a threaded bore 33. Slidably supported in the lower end of the tubes 30 are smaller tubes 34. In the upper part of these tubes are disks 35 having a central orifice and radial notches 36.
Movably supported in these tubes and extending through the disks into the bore 33 of the plugs 32 are plungers 37. One end of each of these plungers is threaded for insertion into the plugs and provided with splines 38 adapted to be slidably engaged in the radial notches 36 in the disks. Fixed in the other end of each plunger is a key 39 of tempered steel adapted for insertion in the apertures 25 in the bar 23. The end of each key extends beyond the end of the plunger a distance slightly less than the diameter of the bar 23. Encircling the plungers are coiled springs 40 which are compressed between the plugs and disks and are thereby adapted to press the disks on the head of the plungers as shown in Fig. 3 in which position the curved ends of the tubes 34 conceal the ends of the keys 39. The ends of both the tubes and plungers are curved to fit the transverse curve on the bar 23 on which they are adapted to rest as hereinafter explained.

The stick shown in Fig. 2 consists of a single tube 41. Telescoped over the top end of this tube is a handle 42. Secured in this handle is a plug 43 having a threaded bore and adapted to slide inside the tube 41. Near the center of the length of the tube 41 is a disk 44 fixed within the tube having a central orifice and radial notches 45. Extending through the disk is a rod 46 threaded at each end and provided with splines 47 adapted to slide in the radial notches 45. One end of this rod is screwed into the plug 43, and the other end into a plunger 48. This plunger is slidable in the tube 41 and is provided with a key 49 adapted for the insertion in the apertures in the bar 23. Between the head of this plunger and the disk 44 is a short coiled spring 50. Between the disk and the plug 43 are coiled springs 51. These springs are adapted to hold the tube normally in the extended position shown in Fig. 2, and to thereby conceal the key 49. The ends of the tube and plunger are curved to fit the bar 23 when placed thereon.

Having described the constructional details of my invention, I will now describe its use.

The standards 10 are erected and secured in the extended positions by the connecting rods 11. The cables 22 are then loosely connected with the hooks 21. The T ends of the bar 23 are then placed in the double hooks 16 and the cables drawn taut. The apertures 25 being vertical, they are therefore not visible. The bar is colored to represent a rope. The performer standing on the bar places the end of the stick over one of the apertures 25 presses on the handle 42, and thereby forces the key 49 into the aperture. The stick is thereby keyed into the bar and thereby held in a vertical position with sufficient resistance to lateral pressure to enable a skilled performer to raise himself thereon, and accomplish the hand balance illustrated by the figure 52. The hind legs of the chair are placed upon the bar over the apertures spaced therefor and pressure applied to the chair by which the keys are pressed into the apertures. The resistance in this case is torsional, the resistance thereto secured by the connection of the bar with the double hooks is sufficient to enable the performer to raise himself upon the chair, and balance himself in various positions and means illustrated by the figure 53.

What I claim as new and desire to secure by Letters Patent is:—

1. A device of the kind described, consisting of standards, means secured to said standards adapted to support a metal bar and to prevent a rotary movement thereof, a metal bar having oblong apertures and ends adapted to be held by said means against a rotary moving of said bar, means connected with each of said standards adapted to be secured to the floor or other immovable thing whereby the desired tension on said bar may be secured, and means insertible in said apertures in said bar adapted for the support of a performer as described.

2. A device consisting of a metal bar having oblong apertures, means adapted to support said bar in a horizontal position, means adapted to prevent a rotative movement of said bar, and a stick consisting of a tube telescopically secured in a handle, a key adapted to be inserted in said apertures in said bar, slidable means in said tube adapted to hold said key in a normal position within said tube and to permit the insertion of said key in said bar by pressure on said handle, for the purpose described.

3. A device consisting of a metal bar having oblong apertures, means adapted to support said bar and prevent a rotary motion thereof, a chair, the hind legs thereof being provided with telescopic tubes, a key in each of said tubes adapted to be inserted in said apertures in said bar, means in said tubes adapted to hold said keys normally within said tubes and to permit their insertion in said apertures by the application of pressure on said chair, for the purposes described.

CARL J. RASCHETTA.

Witnesses:
JULIUS RUBINSTEIN,
THOMAS J. MORGAN.